Patented Jan. 13, 1953

2,625,530

UNITED STATES PATENT OFFICE 2,625,530

SYNTHETIC RESINS

George L. Doelling, St. Louis, and Kenneth H. Adams, Fenton, Mo., assignors to Mississippi Valley Research Laboratories, Inc., St. Louis, Mo., a corporation of Missouri No Drawing. Application April 30, 1949,
Serial No. 90,762

13 Claims. (Cl. 260—43)

This invention relates to synthetic resins and more particularly to thermosetting synthetic resins.

Briefly the invention comprises synthetic thermosetting resins prepared by reacting certain ether resins with phenol-formaldehyde resin compositions and the processes of preparing said synthetic resins.

Among the objects of this invention are the provision of improved synthetic resins which can be used in molding, laminating and in surface coatings; the provision of synthetic resins which are heat-hardened yet flexible; the provision of synthetic resins of the type indicated which may be formed in situ without damaging relatively delicate fibers; the provision of synthetic resins made from preliminary stage resins which can be applied to the material to be treated and the final thermoset resin formed in place by heating; and, the provision of synthetic resins of the type indicated which heat-harden to form hard, smooth, non-tacky and flexible films. Other features will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

The usual phenol-aldehyde type thermosetting resins possess several characteristics which render them unsuitable for many purposes where they could otherwise be beneficially employed. Among some of these disadvantages are their inherent brittleness and low impact resistance. The thermosetting resins of the present invention, however, retain the desirable properties of the ordinary phenol-aldehyde type resins and, moreover, are quite flexible and have a high degree of resistance to impact.

In accordance with the present invention novel thermosetting resins are obtained by the reaction at elevated temperatures of an ether-type resin and a heat-hardenable phenol-aldehyde composition. The term heat-hardenable phenol-formaldehyde composition is used to designate a phenol-formaldehyde resin composition which can be hardened into a hard, thermoset, insoluble resin simply by the application of heat. Such a heat-hardenable resin composition may comprise a phenol-formaldehyde resin with a high ratio of formaldehyde to phenol which is itself heat hardenable, such as a casting resin, or it may comprise an A-stage or first-stage, soluble, phenol-formaldehyde resin plus additional formaldehyde, or an aldehyde producing substance, and a catalyst intermixed therewith. Examples of suitable substances that will yield formaldehyde under certain conditions of heating and processing include hexamethylene tetramine and para-formaldehyde. It is to be understood that the phenol-formaldehyde resin used may include other resins such as those formed from formaldehyde and meta-cresol, or meta-xylenol and mixtures of phenol and cresols and xylenols.

A number of substances may be utilized as catalysts to facilitate hardening under heat of the resin composition, for example, ethylenediamine, other aliphatic amines, aliphatic amino-alcohols, and alkali or alkaline earth metal hydroxides, or other alkaline catalysts. While it is preferred that an alkaline catalyst be used, in some instances an acid such as oxalic, monochloracetic, boric, or phosphoric acid or some other acid in small quantities may be used. In general, however, acid catalysts tend to deteriorate or corrode fabrics, fillers and metals with which they come in contact.

The ether resin employed in the present invention is made by reacting in the presence of an alkali and at elevated temperatures certain dihydric phenols having the following formula:

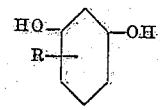

in which R is a hydrogen, a lower alkyl or a lower acyl group, with a dihalide of a polyethylene glycol having the following formula:

in which $n$ is an integer not less than three and not greater than thirty and X is selected from the group consisting of chlorine and bromine. The molar ratio of the dihydric phenols to the polyethylene dihalide is preferably approximately 1:1.

Not all dihydric phenols can be used to produce satisfactory ether resins according to this invention. Suitable compounds are resorcinol, orcinol, resacetophenone and the lower alkyl derivatives of resorcinol.

Suitable dihalides include the dichloride of tetraethylene glycol, the dibromide of tetraethylene glycol, the dichloride of hexaethylene glycol, the dichloride of nonaethylene glycol, the dichloride of a polyethylene glycol having a molecular weight of 600, and the dichloride of a polyethylene glycol having a molecular weight of 1000. In each case these dichlorides are the compounds formed by replacing each of the two OH groups of a polyethylene glycol by halogen. The dichlorides of polyethylene glycols lower than tetra are not suitable for this purpose since they are too short in chain length to give the desired plasticizing effect or the desired flexibility in the final product. Tetraethylene glycol dichloride and the hexa, nona, etc. dichlorides do give the desired properties in the final product.

Structural analysis indicates that the resorcinol-ether type resin has a formula approximately as follows:

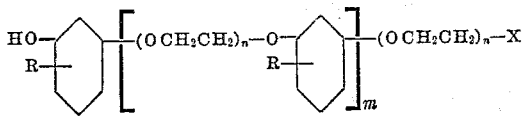

where $n$ is an integer not less than four and not more than thirty, $m$ is an integer from approximately two to approximately ten, X is selected from the group consisting of chlorine and bromine and R represents hydrogen, a lower alkyl or a lower acyl group. However, notwithstanding the accuracy of the above structural representation, the reaction product of the certain dihydric phenols referred to above and the polyethylene glycol dihalides serves as one of the two resin components which are reacted together to form the flexible thermosetting resins of the present invention. This resorcinol-ether resin has the surprising and valuable property of acting as a "built-in" plasticizer for the final resin resulting from the reaction of the ether-type and the heat-hardenable phenol-aldehyde resin compositions.

The range of the ratio of the ether resin to the phenol-aldehyde type resin may be varied between approximately 1:9 to 9:1. However, an approximately equal ratio by weight of the component resins is preferably employed.

The synthetic resin of our invention can be coated on steel, cloth or wood or other substance as a surface coating which is very resistant to water, solvents, etc. It can also be used together with asbestos, cotton flock, chopped cloth or other filler to make molded articles, and by impregnating cotton cloth, nylon cloth or glass fiber products with this resin, laminates can be made that are resistant to shock and impact.

The following examples illustrate the invention:

Example 1

An ether resin was made from resorcinol and the dichloride of hexaethylene glycol by reacting these materials in the following proportions:

|  | Weight | Mols |
|---|---|---|
|  | Grams |  |
| Resorcinol | 49.5 | 0.45 |
| Dichloride of hexaethylene glycol | 145.8 | 0.45 |
| Water | 130.5 | --- |
| Sodium Hydroxide (97%) | 37.1 | 0.90 |

The resorcinol and the dichloride of the hexaethylene glycol and 25 milliliters of water were weighed into a 500 milliliter 3-neck, round-bottomed flask equipped with a mechanical stirrer and reflux condenser. Some heat was applied and the flask flushed out with nitrogen. The sodium hydroxide was then dissolved in the rest of the water and this solution was added to the flask. The batch was heated up to the reflux temperature. The batch was stirred at reflux temperature until the titration of the alkali in a sample removed showed that the reaction had proceeded far enough to produce a resin of the desired molecular weight (about 600 to 3000). The batch was then neutralized with dilute hydrochloric acid (27 milliliters of 5.9N HCl), about 5 milliliters additional acid was added and the batch was stirred thoroughly. The batch was transferred to a 1 liter flask, the water layer decanted and the batch washed with 4 portions of 400 milliliters each of boiling water. The residual water was removed by heating in an oil bath finally at 140°–145° C. under vacuum. The yield of resin was 152 grams. This resin had a molecular weight of 1000 as determined by the camphor method.

This resin was an amber colored soft resin which is fluid at elevated temperatures but just barely flows at room temperature.

The average molecular weight of the dichloride, used in the above and subsequent batch calculations, was calculated from the percent of organic chlorine found on analysis of the dichloride.

Example 2

Five grams of the ether resin of Example 1 together with 5 grams of phenol-formaldehyde spirit-soluble laminating resin and 0.5 gram of hexamethylene tetramine were dissolved in 10 grams of acetone and alcohol (50–50 mixture) and the resulting solution was warmed slightly. Films were then cast on metal slides by floating about 1 milliliter of the solution on a slide and evaporating the solvent at temperatures ultimately reaching 70° to 80° C. The resulting film was then baked at 140° C. to 145° C. for 15 minutes. This film was hard at baking temperature and at room temperature, substantially insoluble in ordinary organic solvents and would withstand considerable flexing without breaking. A film made of the phenol-formaldehyde resin alone was very brittle and would stand no flexing at all without cracking.

Example 3

Five grams of the ether resin of Example 1 was intermixed with 5 grams of phenol-formaldehyde resin (casting resin), 5 grams of acetone and 5 grams of ethyl alcohol.

The phenol-formaldehyde resin used was made by heating phenol (1 mol) with formaldehyde (2.5 mols) using sodium hydroxide as a catalyst. After reaction the batch was adjusted to substantial neutrality with lactic acid and then dehydrated under vacuum. As the resin was of the casting resin type and was, therefore, a heat-hardenable resin per se, it did not require the incorporation of additional aldehyde or catalyst but only heat to convert it to an insoluble thermoset resin.

Test slides were made by floating approximately 1 milliliter of the above solution onto flexible metal slides. The solvents were evaporated and then the slide was baked at 145° C. for 20 minutes. The resulting resin film was hard at baking temperature and at room temperature and was insoluble in ordinary solvents such as ketones and alcohol. The resin film was tough and not brittle and could be bent through an angle of 90° or more without breaking.

Example 4

The following materials were intermixed and the resulting solution was warmed.

| | Grams |
|---|---|
| Resin from Example 1 | 8 |
| Phenol-formaldehyde spirit-soluble laminating resin | 2 |
| Hexamethylene tetramine | 0.4 |
| Acetone | 5 |
| Ethyl alcohol | 5 |

Films were then cast from this solution by the method described in Example 2. The film was rubbery and clear, demonstrating that the resins are compatible in this ratio.

Example 5

The following materials were intermixed to form a solution as described in Example 2.

| | Grams |
|---|---|
| Resin from Example 1 | 2 |
| Phenol-formaldehyde spirit-soluble laminating resin (heat-hardenable per se) | 8 |
| Acetone | 5 |
| Ethyl alcohol | 5 |

The resulting film was insoluble in methyl ethyl ketone and other common solvents. It was clear and definitely less brittle than a film made from phenol and formaldehyde alone.

Example 6

A solution was made from the following components:

| | Grams |
|---|---|
| Resin from Example 1 | 5 |
| Phenol-formaldehyde resin (casting resin) | 5 |
| Acetone | 5 |
| Ethyl alcohol | 5 |
| Oxalic acid | 0.1 |

A film was then cast from this solution by the method described in Example 2. This film was hard at 140° C. and hard and fairly flexible at room temperature. It was immersed in a 50-50 mixture of ethyl alcohol and acetone for several days with no visible change occurring.

Example 7

An ether resin was made by reacting resorcinol with the dichloride made from tetraethylene glycol by replacing each of the two hydroxy groups with chlorine, in a manner similar to that described in Example 1 by reacting these materials in the following proportions:

| | Weight | Mols |
|---|---|---|
| | Grams | |
| Resorcinol | 44 | 0.4 |
| Dichloride of tetraethylene glycol | 94.8 | 0.4 |
| Sodium hydroxide (97%) | 33 | 0.8 |
| Water | 116 | |

The resin produced weighed 109 grams. It was a soft resin not soluble in water but soluble in solvents such as methyl ethyl ketone. Its molecular weight was 1196.

When this ether resin was mixed with an equal weight of a spirit soluble phenol-formaldehyde laminating resin plus hexamethylene tetramine (5% of weight of ether resin) and a film made as described in Example 2, the resulting film was clear, showing that the two resins are compatible. The film was hard and not brittle as it could be bent through more than a 90° angle without breaking. Phenol and formaldehyde alone in this same test will break at the slightest bend of the slide.

Example 8

An ether resin was made by reacting resorcinol with the dichloride made from nonaethylene glycol by replacing each of the two hydroxy groups with chlorine, in the manner described in Example 1, by reacting these materials in the following proportions:

| | Weight | Mols |
|---|---|---|
| | Grams | |
| Resorcinol | 49.5 | 0.45 |
| Dichloride of nonaethylene glycol | 196.6 | 0.45 |
| Sodium hydroxide (97%) | 37.1 | 0.90 |
| Water | 130.5 | |

The ether resin produced was a soft resin, soluble in common organic solvents and had a molecular weight of 1665.

A film was made from this ether resin (4 grams) plus spirit soluble phenol-formaldehyde resin (4 grams) and hexamethylene tetramine (0.2 gram), with acetone-ethyl alcohol as solvent, in a manner similar to Example 2. The resulting film was hard, insoluble and would withstand considerable flexing without breaking.

Example 9

An ether resin was made by reacting resorcinol with the dichloride made by replacing each of the two hydroxy groups in a polyethylene glycol of molecular weight of approximately 600, in a manner similar to Example 1, except that chloroform was used to recover the ether resin from the reaction mixture.

This ether resin was a soft resin of a molecular weight of 1623. It was compatible with heat-hardenable phenol-formaldehyde resins, and films made from such a combination in a manner similar to those previously described had properties similar to those of the resin of Example 2.

Example 10

An ether resin was made by reacting orcinol with the dichloride made by replacing each of the two hydroxy groups in hexaethylene glycol, in a manner similar to Example 1, by reacting these materials in the following proportions:

| | Weight | Mols |
|---|---|---|
| | Grams | |
| Orcinol | 49.6 | .40 |
| Dichloride of hexaethylene glycol | 129.6 | .40 |
| Sodium hydroxide (97%) | 33.0 | .80 |
| Water | 117.0 | |

One hundred and thirty-eight grams of ether resin were obtained which had properties similar to those of the ether resin of Example 1 but with a molecular weight of 945.

When mixed with a heat-hardenable phenol-formaldehyde resin this ether resin gave a clear film which had properties analogous to those of the resin described in Example 2.

Example 11

An ether resin was made by reacting resacetophenone with the dichloride made by replacing each of the two hydroxy groups in a polyethylene glycol of molecular weight of approximately 600, in a manner similar to Example 1, by reacting these materials in the following proportions:

| | Weight | Mols |
|---|---|---|
| | Grams | |
| Resacetophenone | 48.6 | .32 |
| Dichloride of polyethylene glycol of molecular weight of 600 | 195.8 | .32 |
| Sodium hydroxide (97%) | 26.4 | .64 |
| Water | 92.5 | |

The ether resin produced was a soft resin weighing 206 grams. When mixed with a heat-hardenable phenol-formaldehyde resin in the manner described in Example 2 it was found to be compatible and to give a resin of greater flexibility and less brittleness than the phenol-formaldehyde resin alone.

Example 12

An ether resin was made by reacting resorcinol with the dichloride made by replacing each of the two hydroxy groups in a polyethylene glycol of molecular weight of approximately 1000, in a manner similar to Example 1, by reacting these materials in the following proportions:

|  | Weight | Mols |
|---|---|---|
|  | Grams |  |
| Resorcinol | 11.0 | .10 |
| Dichloride of polyethylene glycol of molecular weight of 1000 | 94.8 | .10 |
| Sodium hydroxide (97%) | 8.4 | .20 |
| Water | 29.0 |  |

The ether resin produced weighed 89 grams and was of a wax-like consistency. It had a molecular weight of 2024. When mixed with a first-stage phenol-formaldehyde resin and hexamethylene tetramine as previously described it gave a resin more flexible and less brittle than the phenol-formaldehyde resin alone.

Example 13

A laminated solid was made using a solution made of the following materials:

Resorcinol-ether resin from Example
  1 _____grams__ 10
Hexamethylene tetramine_____do____ 0.5
Phenol-formaldehyde spirit-soluble
  laminating varnish (68% solids)__do____ 14.7
Acetone _____milliliters__ 5
Ethyl alcohol_____do____ 5

These materials were dissolved in the solvents under slight warming. Then this solution was used to impregnate strips of nylon cloth made from spun fiber. After the solvent had evaporated the strips were reweighed and there was 60% by weight of resin and 40% by weight of cloth in the dried strips. By pressing under heat a number of these coated strips, a laminate approximately one-eighth inch thick was made. It was pressed at 140° C. to 145° C., and the pressure for the first two minutes was kept low, followed by eight minutes at 600 pounds per square inch. A strong, well-bonded laminate resulted which would withstand considerable flexing and was unaffected by immersion in a mixture of acetone and ethyl alcohol for an hour or more. The tensile strength was determined on a sample of this type of laminate and it was found to be 12,200 pounds per square inch. There was considerable elongation of the test sample before breaking which further proves that this resin is not brittle like ordinary phenol-formaldehyde.

Example 14

A resorcinol ether-resin was made from resorcinol and the dibromide of hexaethylene glycol by reacting the following materials in the following proportions:

|  | Weight | Mols |
|---|---|---|
|  | Grams |  |
| Resorcinol | 27.5 | .25 |
| Dibromide of hexaethylene glycol | 93.1 | .25 |
| Sodium hydroxide (97%) | 20.6 | .50 |
| Methyl alcohol | 80 |  |
| Water | 12.5 |  |

The sodium hydroxide, water and methyl alcohol were charged into a 500 ml. round bottom flask equipped with a reflux condenser and mechanical stirrer. The flask was flushed out with nitrogen, then the resorcinol was added and some heat applied while the dibromide was dropped in with stirring over about 10 or 15 minutes. The batch was heated to the reflux temperature (about 74° C.) and held there while being stirred until the titration of a test sample showed that the reaction was about 90 to 95% complete. About 4¼ hours were required to reach this stage. The batch was then neutralized with 4.5 ml. of 6N hydrochloric acid, washed with several portions of hot water, and then dehydrated as described in Example 1. The product weighed 72 grams. It was a clear, amber-colored, soft resin which barely flowed at room temperature. The molecular weight of this resin was 1330, by the camphor method.

5 grams of this ether-resin and 5 grams of an acid-catalyzed, molding-type of phenol-formaldehyde resin and .7 gram of hexamethylene tetramine were dissolved in 10 ml. of ethyl alcohol-acetone solvent (50–50 mixture). About 1 milliliter of this solution was floated onto a sheet-metal slide, the solvent evoporated, and the resulting film baked for 15 minutes at 145° C. The resin film was now clear, hard and had considerable flexibility.

It has also been found in accordance with the present invention that in the preparation of ether-resins by the use of dihalides which react rather rapidly, the reaction can be controlled more readily if part of the water is replaced by an organic solvent such as one of the low aliphatic alcohols, and a lower reaction temperature is used. With either the dichlorides or dibromides, if the reaction is allowed to proceed too far, an insoluble resin may result.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. A substantially insoluble heat-hardened resin comprising the product of reaction under heat and in the presence of a substance selected from the group consisting of formaldehyde and a formaldehyde-yielding substance of from approximately 10 parts to approximately 90 parts by weight of a heat-hardenable phenol-formaldehyde composition from approximately 90 parts to approximately 10 parts by weight of an ether resin having the formula:

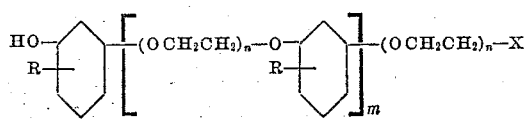

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen.

2. A substantially insoluble heat-hardened resin comprising the product of reaction under heat of from approximately 10 parts to approximately 90 parts by weight of a thermosetting resin made with phenol and formaldehyde in the approximate ratio of 1:2.5 respectively and from approximately 90 parts to approximately 10 parts by weight of an ether resin having the formula:

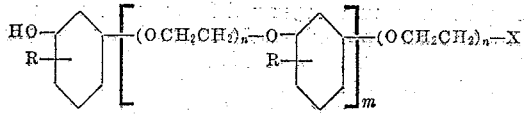

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen.

3. A substantially insoluble heat-hardened resin comprising the product of reaction under heat and in the presence of a catalyst of from approximately 10 parts to approximately 90 parts by weight of an A-stage soluble phenol-formaldehyde resin and from approximately 90 parts to approximately 10 parts by weight of an ether resin having the formula:

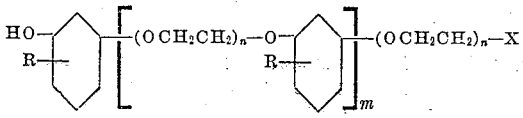

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen, together with from approximately 1 to 10 parts by weight of a substance selected from the group consisting of formaldehyde and formaldehyde-yielding substances for each 100 parts of the total of the phenolformaldehyde and ether resins.

4. A substantially insoluble heat-hardened resin comprising the product of reaction under heat and in the presence of an alkaline catalyst of from approximately 10 parts to approximately 90 parts by weight of an A-stage soluble phenolformaldehyde resin and from approximately 90 parts to approximately 10 parts by weight of an ether resin having the formula:

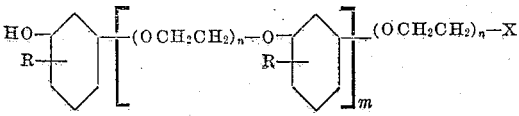

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen, together with from approximately 1 to 10 parts by weight of a substance selected from the group consisting of formaldehyde and formaldehyde-yielding substances for each 100 parts of the total of the phenol-formaldehyde and ether resins.

5. A substantially insoluble heat-hardened resin comprising the product of reaction under heat and in the presence of an alkaline catalyst of from approximately 10 parts to approximately 90 parts by weight of an A-stage soluble phenol-formaldehyde resin and from approximately 90 parts to approximately 10 parts by weight of an ether resin having the formula:

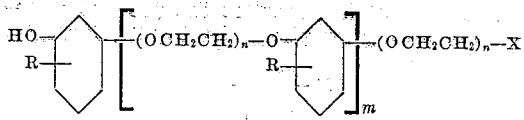

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen, together with from approximately 1 to 10 parts by weight of hexamethylene tetramine for each 100 parts of the total of the phenol-formaldehyde and ether resins.

6. A substantially insoluble heat-hardened resin comprising the product of reaction under heat and in the presence of a substance selected from the group consisting of formaldehyde and a formaldehyde-yielding substance of from approximately 10 parts to approximately 90 parts by weight of a heat-hardenable phenol-formaldehyde composition and from approximately 90 parts to approximately 10 parts by weight of an ether resin which comprises the product of reaction under heat and alkaline conditions of a dihydric phenol having the formula:

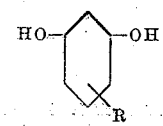

in which R is selected from the group consisting of lower alkyl and acyl radicals and hydrogen, and a polyethylene glycol dihalide having the formula:

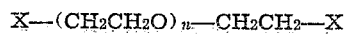

in which X is a halogen selected from the group consisting of chlorine and bromine, and $n$ is an integer not less than approximately 3 nor more than approximately 30.

7. The method of forming substantially insoluble heat-hardened resins comprising reacting in the presence of a substance selected from the group consisting of formaldehyde and a formaldehyde-yielding substance from approximately 10 parts to approximately 90 parts by weight of a heat-hardenable phenol-formaldehyde composition with from approximately 90 parts to approximately 10 parts by weight of an ether resin having the formula:

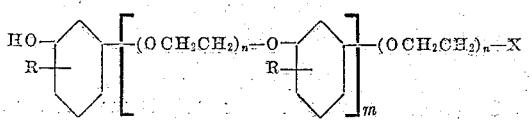

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen.

8. The method of forming substantially insoluble heat-hardened resins comprising reacting in the presence of a substance selected from the group consisting of formaldehyde and a formaldehyde-yielding substance under heat from approximately 10 parts to approximately 90 parts by weight of a heat-hardenable phenolformaldehyde composition with from approximately 90 parts to approximately 10 parts by weight of an ether resin which comprises the product of reaction of a dihydric phenol having the formula:

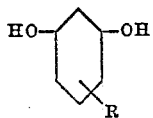

in which R is selected from the group consisting of lower alkyl and acyl radicals and hydrogen, and a polyethylene glycol dihalide having the formula:

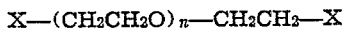

in which X is a halogen selected from the group consisting of chlorine and bromine, and $n$ is an integer not less than 3 nor more than approximately 30, the molecular weight of such ether resin being between approximately 600 and 3000.

9. The method of forming substantially insoluble heat-hardened resins comprising reacting from approximately 10 parts to 90 parts by weight of a thermosetting resin made with phenol and formaldehyde in the approximate ratio of 1:2.5 respectively with from approximately 90 parts to approximately 10 parts by weight of an ether resin having the formula:

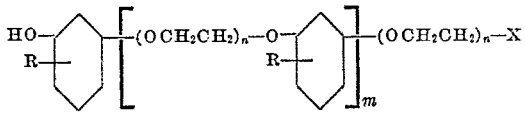

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen.

10. The method of forming substantially insoluble heat-hardened resins comprising reacting in the presence of a catalyst from approximately 10 parts to 90 parts by weight of an A-stage soluble phenol-formaldehyde resin with from approximately 90 parts to approximately 10 parts

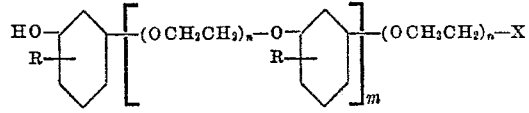

by weight of an ether resin having the formula: in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen, together with from approximately 1 part to 10 parts by weight of a substance selected from the group consisting of formaldehyde and formaldehyde-yielding substances for each 100 parts of the total of the phenol-formaldehyde and ether resins.

11. The method of forming substantially insoluble heat-hardened resins comprising reacting in the presence of an alkaline catalyst approximately equimolecular proportions of an A-stage soluble phenol-formaldehyde resin with an ether resin having the formula:

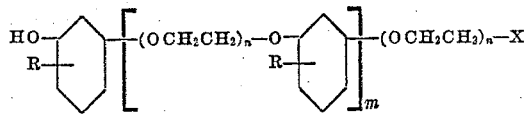

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen, together with from approximately 1 part to 10 parts by weight of hexamethylene tetramine for each 100 parts of the total of the phenol-formaldehyde and ether resins.

12. The method of forming substantially insoluble heat-hardened resins comprising reacting in the presence of an alkaline catalyst approximately equimolecular proportions of a thermosetting resin made with phenol and formaldehyde in the approximate ratio of 1:2.5 respectively with an ether resin having the formula:

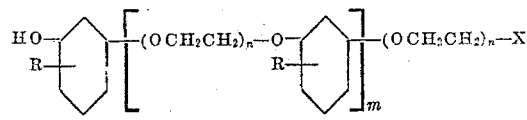

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen.

13. A laminated article which comprises a fiber base and a substantially insoluble heat-hardened resin comprising the product of reaction under heat and in the presence of a substance selected from the group consisting of formaldehyde and a formaldehyde-yielding substance of from approximately 10 parts to approximately 90 parts by weight of a heat-hardenable phenol-formaldehyde composition and from approximately 90 parts to approximately 10 parts by weight of an ether resin having the formula:

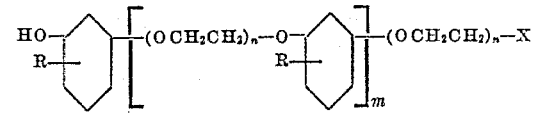

in which $n$ is an integer not less than 4 and not greater than approximately 30, $m$ is an integer from approximately 2 to 10, X is a halogen selected from the group consisting of chlorine and bromine, and R is selected from the group consisting of lower alkyl and acyl radicals and hydrogen.

GEORGE L. DOELLING.
KENNETH H. ADAMS.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,485,711 | Doelling et al. | Oct. 25, 1949 |